United States Patent [19]

Rees

[11] 3,727,453
[45] Apr. 17, 1973

[54] APPARATUS FOR TESTING AIR BRAKE CONTROL VALVES

[75] Inventor: James G. Rees, Hammond, Ind.

[73] Assignee: Chicago Pneumatic Tool Company, New York, N.Y.

[22] Filed: Aug. 3, 1971

[21] Appl. No.: 168,547

Related U.S. Application Data

[63] Continuation-in-part of Ser. No. 821,801, May 5, 1969, Pat. No. 3,596,500.

[52] U.S. Cl. .................................................... 73/39
[51] Int. Cl. ............................................. G01m 3/26
[58] Field of Search ................... 73/39, 121; 269/25, 269/77, 27

[56] References Cited

UNITED STATES PATENTS 2,103,305   12/1937   Thomas ................................ 73/39

Primary Examiner—Donald O. Woodiel
Attorney—Stephen J. Rudy

[57] ABSTRACT

Apparatus is provided for testing air brake valve portions. The apparatus features a fluid operated brake clamp to confine the air brake control valve portion by applying sealing pressure to the air brake portion from a pivotable C-clamp which is free to move longitudinally with respect to the air brake portion. In addition, the apparatus includes a device for confining and locating the air brake control via a controlable piston stop contained within a sealed chamber. Several air control valves in the test apparatus are activated automatically, and substantially the entire test program is conducted on automatic control.

4 Claims, 7 Drawing Figures

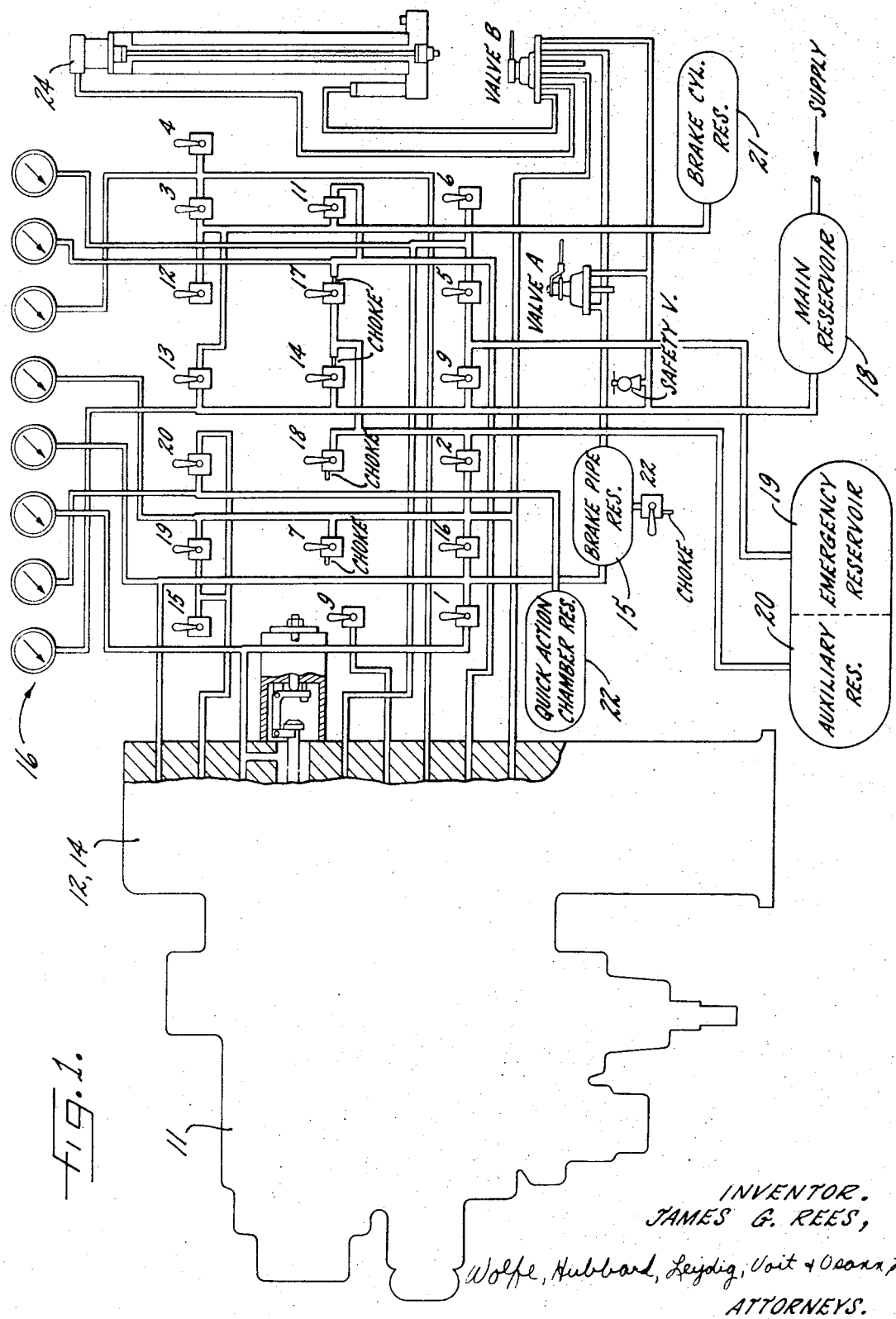

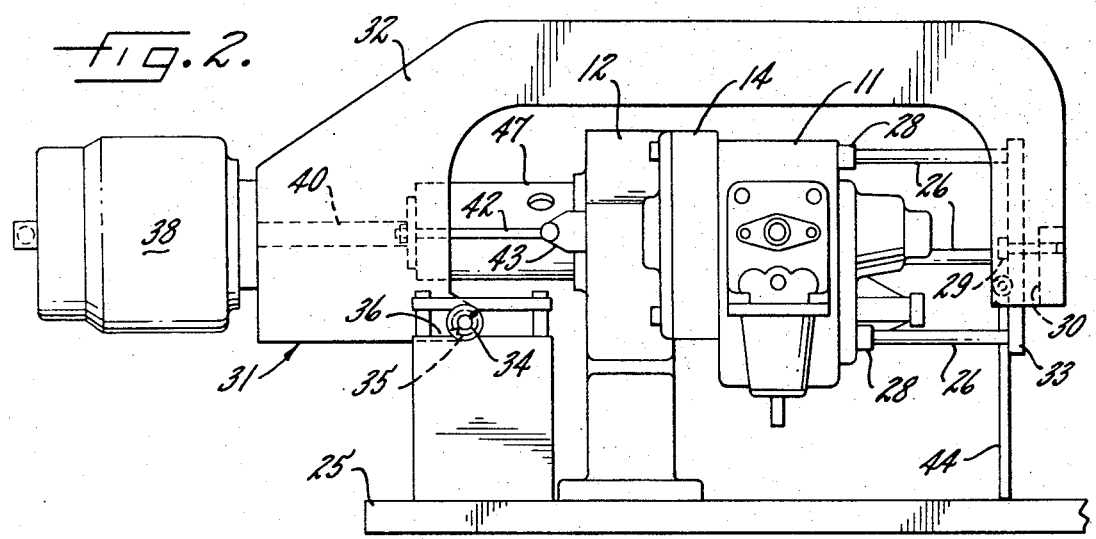
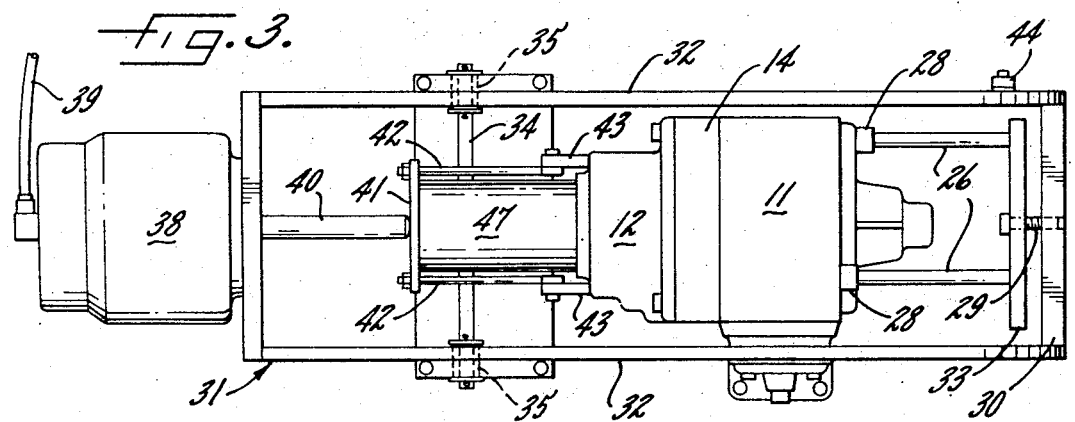
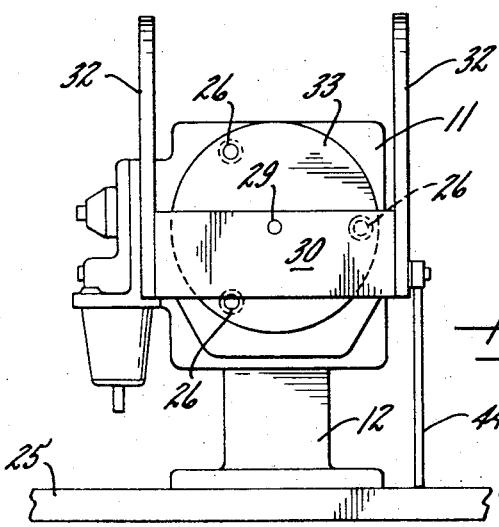

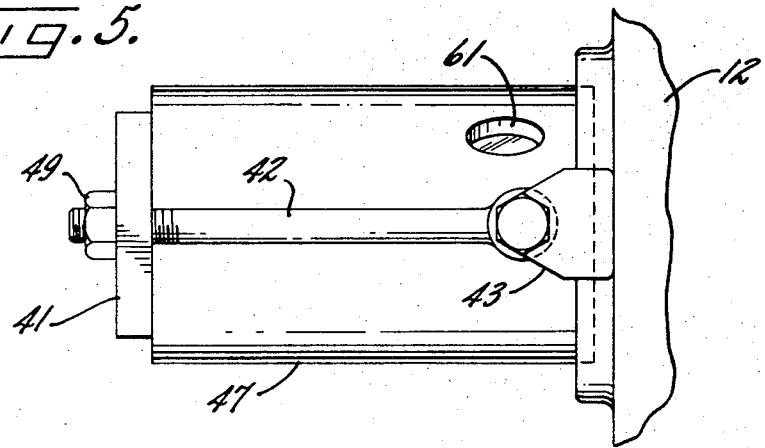
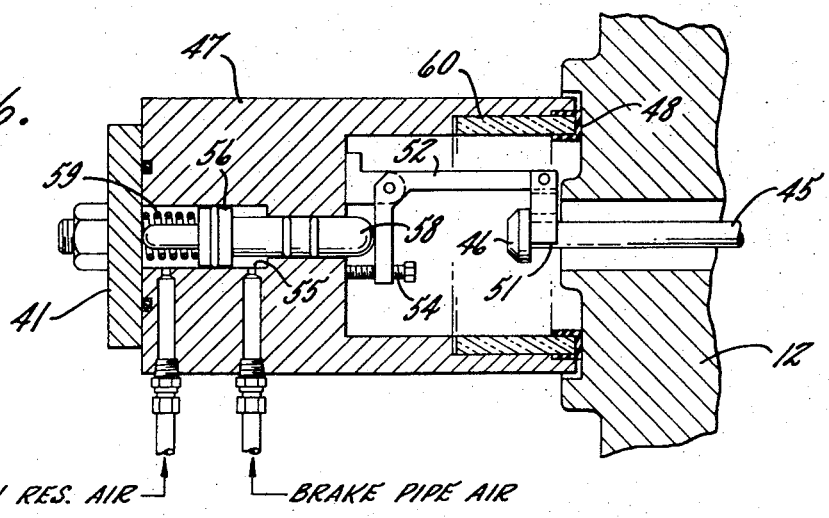
MAIN RES. AIR — BRAKE PIPE AIR
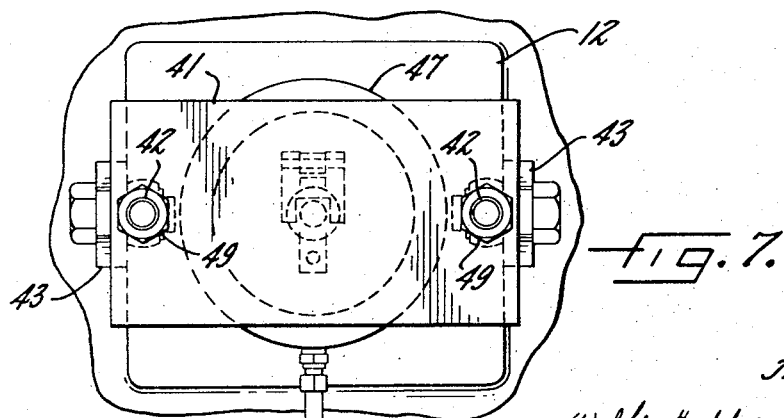
INVENTOR.
JAMES G. REES,
Wolfe, Hubbard, Leydig, Voit & Osann Ltd
ATTORNEYS.

3,727,453

APPARATUS FOR TESTING AIR BRAKE CONTROL VALVES

CROSS REFERENCE AND RELATED APPLICATIONS

This application is a continuation-in-part of my copending application Ser. No. 821,801 filed May 5, 1969, now U.S. Pat. No. 3,596,500 to be issued Aug. 3, 1971.

BACKGROUND AND OBJECTS

This invention relates to apparatus for testing railway brake control valves, and more particularly concerns the provision of apparatus adapted to facilitate and automate programmed tests of such valves.

Once every four years, the Association of American Railroads and the Interstate Commerce Commission require that each air brake on freight trains be removed from the train and subjected to a sequence of functional tests. The air brake control valve, divided into the "service" portion and the "emergency" portion, is tested on a manual test stand, with each brake control valve portion being subjected to various movement resistance, leakdage, port capacity, and charging rate tests.

These tests are more or less standard, and are described in Instruction Pamphlet No. 5039-19, February, 1962, entitled "Code of Tests, 'AB' Freight Equipment Valves, The 'AB' Test Rack, as adopted by the Association of American Railroads", published by the Westinghouse Air Brake Company, Air Brake Division, Wilmerding, Pennsylvania. The freight brake itself is described in Instruction Pamphlet No. 5062, December 1945, "The 'AB' Freight Brake Equipment", also published by Westinghouse. The test rack is also described in Thomas U.S. Pat. No. 2,103,305. These Instruction Pahmphets are incorporated by reference herein.

Conventionally, the air brake control valve is disassembled into its service portion and its emergency portion, and each of the respective portions is tested on the manual device described in Instruction Pamphlet No. 5039-19.

The sequence of tests is extremely complex. The conventional testing device includes an array of manually controlled valves, pressure gauges, and the like, all of which must be operated in a designated sequence so as to subject each valve portion to the prescribed battery of tests. This sequence is complicated, and is time-consuming even for trained operators. Moreover, it is difficult to train the operators, and consequently labor cost represents a substantial fraction of brake testing expense. It is accordingly an object of the invention to provide an apparatus for automatically conducting the test.

Conventional manual testing of brake control valves has other serious disabilities. For one thing, the test operator must visually monitor the various pressures and rates, with the attendant possibility of error due to personal judgment at best, or the likelihood of overlooking a faulty valve at worst. Thus, if a malfunction is overlooked, the defective valve is returned to service. On the other hand, if a properly functioning valve is erroneously reported as having failed one of the tests, the resulting disassembly and repair of the control valve is both unnecessary and expensive. It is another object of the invention to provide a testing apparatus completely free of the possibility of individual error in conducting the test sequence.

The conventional test sequence and test apparatus have long been recognized as necessary but awkward. The test operator is required to observe rather large pressure drops for either short periods or for long periods. If the time is short, the pressure drop is difficult to observe; if long, the procedure is slow. Furthermore, for some of the tests it is necessary for the operator to observe pressures on two gauges simultaneously and then note the difference. The possibility of error in determining small differences between large numbers is self evident. A further object of the invention is to provide automatic apparatus for shortening the time but increasing the reliability of air brake control valve testing equipment.

Additionally, the air brake control valve test assembly that is commonly employed itself requires frequent scheduled validation of its components. Instruction Pamphlet No. 5039-19 contains an extensive section of test rack validation procedures to periodically insure the accuracy of air pressure gauges, other assorted equipment, and the non-existence of leaks and other malfunctions which would mitigate against providing accurate control valve tests. Also, the conventional test apparatus must be disassembled, cleaned, and lubricated quite frequently. Another object of the invention is to provide an improved control valve test assembly which is less subject to test assembly malfunction.

Certain of the conventional valve test assembly components are particularly awkward. Perhaps outstanding in this respect is the means for attaching the air brake portion to the test rack itself. Although to some extent the air brakes manufactured by different companies are interchangeable, it has heretofore not been possible to provide for universal adaptors by reason of the significant differences among valves made by different manufacturers and, in some cases, between different models of valves made by the same manufacturer. In addition, different adaptors are necessary for the control and for the emergency portions of the air brake control valve. It is therefore a further object of the invention to provide an improved air brake clamping device whereby air brake portions made by different manufacturers, as well as both the service and the emergency portions, may readily be accommodated on the same test stand.

Additionally, for certain tests in the sequence of testing the air brake control valves, it is necessary to confine and locate an internal piston in the valve. Previously this confining and locating action has been awkward, imprecise, and tedious. An ancillary object of the invention is to provide an improved apparatus for confining and locating the internal pistons of railway brake control valve at designated stages of the test sequence.

Still another object is to provide a test device in which each of the programmed tests is reported as an absolute "pass" or "fail" on a permanent record. Another object is to provide an automatic control system for railway air brake control valve tests which integrates test sequence control, valve regulation, electrical and/or electronic circuitry, and pneumatic flow and pressure measurement.

Other objects, aims, and advantages of the invention will become apparent as the following description proceeds.

While the invention is susceptible of various modifications and alternative forms, a specific embodiment thereof has been shown by way of example in the drawings and will herein be described in detail. It should be understood, however, that it is not intended to limit the invention to the particular form disclosed, but, on the contrary, the intention is to cover all modifications, equivalents, and alternatives falling within the spirit and scope of the invention as expressed in the appended claims.

BRIEF DESCRIPTION OF DRAWINGS

FIG. 1 schematically depicts the air brake test assembly, in this case with the service portion of a Westinghouse "AB" freight equipment valve in position;

FIG. 2 is an elevation of the clamping device used to mount the air brake portion to a bracket on the test rack;

FIG. 3 is a top view of the clamping device;

FIG. 4 is an end view of the clamping device, taken along plane A—A of FIG. 2;

FIG. 5 is an enlarged elevation of the apparatus for confining and locating an internal piston of the brake control valve during testing;

FIG. 6 is a sectional view, corresponding to FIG. 5, showing the functional components of the confining and locating apparatus;

FIG. 7 is an end view of the apparatus of FIGS. 5 and 6;

DETAILED DESCRIPTION

Turning first to FIG. 1, a schematic flow and pressure control and monitoring system is depicted corresponding to the system employed both with conventional test racks and with the apparatus according to the invention. As indicated in the drawing, the diagrammatic piping arrangement is adapted to apply compressed air to the various numbered ports extending to a portion of the air brake control valve, here depicted as the service portion 11, via an upright bracket 12 and an adaptor plate 14 (FIG. 2), shown in FIG. 1 as a single element 12, 14.

The various conduits communicating via the elements 12, 14 extends to a series of control valves arranged on a panel, the individual valves being operated manually in a conventional test rack and by solenoid control in the system of the present invention.

The array of valves bear numbers corresponding to the conventional numbering system used with the Westinghouse test rack, that is, reading from right to left and then from top to bottom, numbers: 15, 19, 20, 13, 12, 3, and 4 on the top row; 9, 7, 18, 14, 17, and 11 on the middle row; and 1, 16, 2, 9, 5, and 6 on the bottom row. Valves 7, 18, 14, and 17 connect with chokes or throttles, respectively number 63 drill size, number 73 drill, number 50 drill, and 3/16 drill. Similarly, valve number 22, connecting to the brake type reservoir 15, leads to a number 30 drill choke.

Several additional valves are included in the system depicted in FIG. 1. Conventionally, valve "A" is a rotary valve, described at pages 22 and 23 of Instruction Pamphlet No. 5039-19. In keeping with the present system, where all of the valves are activated by solenoid control on pneumatic diaphragm valves, valve "A" is removed and in its place the solenoid valve combinations are used. By the same token, valve "B", a manual valve in the conventional test rack, is replaced with a series of solenoid valves. In all functional respects, however, valves "A" and "B" operate identically irrespective of whether they are manually or automatically controlled.

At the top of FIG. 1 are shown a series of pressure gauges 16, corresponding to the pressure gauges used in the conventional test rack. Reading from left to right, these gauges 16 are the main reservoir pressure, quick action chamber pressure, brake pipe line pressure, brake pipe volume, auxiliary reservoir pressure, brake cylinder reservoir pressure, secondary quick service pressure, and emergency reservoir pressure gauges. The various reservoirs shown in FIG. 1 similarly correspond to those in the conventional test rack assembly, and a particular advantage of the present invention is that an existing test rack provides all but the automatized components for a test rack system as described herein. Thus, the test rack equipment includes a main reservoir 18, an emergency reservoir 19, an auxiliary reservoir 20, a brake cylinder reservoir 21, and a quick action chamber reserovir 22.

As will be described presently, it is possible, under the control of the test program sequencing controller, to connect any of the internal test pressure singly or in pairs to the pressure sensing system represented by the gauges 16 in FIG. 1. In keeping with the invention, the pressure sensing system comprises four pressure difference switches, each containing two separate and adjustable circuits permitting a variation of eight pressure differences. One of the pressure difference switches has an adjustable setting under the control of the operator, who adjusts the setting when switching the present test rack for a test on one type of valve to another. In addition, the pressure sensing system contains five dual setting, single pressure switches, which allows up to ten different pressures to be read. Thus, by reading the difference between two pressures, typically the difference between the auxiliary and main reservoir pressures, or by timing the opening and closing of the various valves, the pressure drop or pressure increase over a given period of time is readily determined. This, it will be appreciated, is performed in the same manner as a manually operated conventional test rack.

The manometer 24 on a conventional system is advantageously replaced with two pressure sensing transducers, each provided with an adjustable pressure setting controlling a two-pole double throw relay. Sensing of pressure differences is photo-electric, and the signal is amplified by a solid state amplifier.

Turning now to FIGS. 2, 3 and 4, testing is initiated by clamping a railroad air brake portion 11 onto the test stand, represented by base 25. Extending from the base 25 is an upright bracket 12, onto which is removably secured an adaptor plate 14. Ordinarily, a series of adaptor plates is employed, one each corresponding to the emergency and the service portions of a railway air brake control valve, with as many additional adaptors 14 as may be required to accommodate brake portions of different designs.

To mount the valve portion 11 onto the adaptor plate 14, a series of brake-engaging studs is provide on the air brake portion-facing surface of the adaptor plate 14. These studs, not shown in the drawings, project partly into a series of bolt holes in the air brake valve portion 11 normally used to mount the portion 11 onto the complete air brake assembly (see Instruction Pamphlet No. 5062).

Axially aligned with each of these studs is a series of pressure point rods 26 (FIG. 4), in this case there being three such pressure point rods 26. The rods 26 each have abutting ends 28 to apply pressure onto the portion 11 in a direction toward the adaptor plate 14 and the upright bracket 12. The pressure point rods are threaded into tapped holes in an equalizing adaptor pressure plate 28, and this plate 28 in turn is pivoted on a pivot 29, best shown in FIG. 3, to an abutment end plate 30.

Clamping is afforded by applying compression to remote ends of a carriage 31, which include a pair of spaced-apart, generally C-shaped clamp sides 32 arranged to straddle the upright bracket 12 and the air brake portion 11, and at the same time to facilitate insertion and removal of the air brake portion 11 at the beginning and end of each test sequence, respectively. The end plate 30, which carries the pressure point rods 26 (FIG. 2) is welded to one end of the clamp sides 32, which end will hereinafter be referred to as the free, or abutment, end.

The opposite end of the carriage 31 is arranged to pivot about an axle or fulcrum 34, contained in a bearing 35. In turn, the bearing 35 is mounted in a crosshead 36 so that the bearing 35 is free to move toward and away from the upright bracket 12 in a perpendicular or normal direction thereto.

Pressure is applied to clamp the control valve portion 11 onto the adaptor plate 14, and this in turn onto the upright bracket 12, from a fluid (either hydraulic or pneumatic) operated piston, or other drive mechanism, 38, supplied with high pressure fluid via conduit 39 (FIG. 3). The piston rod 40 extends to a pressure plate 41, which in turn extends via a pair of eye bolts (best shown on FIG. 5) 42 connected to the upright bracket 12.

It will be appreciated, therefore, that pressure from the piston 38 to the piston rod 40 applies pressure onto one side of the upright bracket 12, whereas this pressure is opposed by the abutment end plate 30 of the opposite end of the carriage 31. As compression is thus applied, the abutment end of the carriage 31 tends to move toward the upright bracket 12 while gaskets (not shown) between the upright bracket 12 and the adaptor plate 14, and between the adaptor plate 14 and the valve 11, are compressed. However, the bearing 35 and the crosshead 36 permit the entire carriage assembly to move perpendicularly with respect to the upright bracket 12 so that no torque is applied to the bracket 12.

One feature of the carriage 31 has been found to be especially advantageous in connection with the present invention. As the assembly of the carriage 31, the piston 38, and all related components is journaled about the axle 34, the entire assembly tends to remain in either the valve-engaged or the valve-disengaged position. This is accomplished by so proportioning the various components that the center of gravity of the entire pivoting assembly is located above and to the right of the axle 34, as seen in FIG. 2. The center of gravity, however, is located so that as the carriage 31 is swung in a counter-clockwise direction, as viewed from the aspect of FIG. 2, it moves to the left of the axle 34, thereby keeping the carriage 31 in a valve-disengaged position without the use of springs, counterweights, or the like.

To employ the clamping device shown in FIGS. 2, 3, and 4, an adaptor plate 14 is placed into position on the upright bracket 12. The carriage 31 is then swung into position, and the pressure point rods 26 are adjusted to abut against the control valve portion 11; precise adjustment of the pressure point rods 26 is unnecessary, since the equidistant positioning of the several rods 26 about their central pivot 29 insures the application of equal pressure irrespective of slight mis-adjustment of the pressure point rods 26.

For clamping the various components into place, it is only necessary that pressure be applied via fluid pressure conduit 39 (FIG. 3) to the piston rod 40. Conversely, to un-clamp the valve portion 11 from the assembly, pressure is withdrawn from the fluid pressure conduit 39, the piston rod 40 retracts, the carriage 31 may be swung free of the valve portion 11, and the valve portion removed.

One other feature of the clamp is worthy of mention. To insure that the clamp carriage 31 is positioned accurately with respect to the valve portion 11, that is, to insure that pressure is applied perpendicularly, an adjustable locating rod 44 is provided at the abutment end of the clamp sides 32. This regulates the angular position of the carriage 31. The locating rod 44 may, as shown, be secured to the carriage 31 or, alternatively, it may be mounted onto the base 25.

Turning now to FIGS. 5, 6 and 7, an apparatus is shown for confining and locating an internal piston of the railway brake control valve during testing. For some test procedures, it is necessary that a piston in the air brake control valve portion be immobilized or otherwise prevented from moving excessively in one direction. Conventionally, a piston stop cover is unbolted from the air brake control valve portion 11 and a piston stop utilized to immobilize the piston. This however requires removal of the piston stop cover and replacement of the cover after the test has been concluded. In keeping with the invention, a confining and locating apparatus is provided which includes a stop stem 45 having a collar 46 at its external end. The internal end, not shown, is threaded into the conventionally tapped hole of a piston located within the air brake control valve portion 11.

A pressure tight housing 47 is connected to the valve portion 11 via an annular resilient gasket 48. Clamping pressure to secure this pressure tight relationship is applied by tightening the nuts 49 on the pair of eye bolts 42 (see also FIGS. 2 and 3) connected to the pintle 43. It will be recalled that pressure from the piston 38 (FIG. 2) is applied to the pressure plate 41, and from there to the control valve portion 11, when the clamp of FIGS. 2, 3 and 4 is in its pressure-applying position.

The pressure tight housing 47 includes a stop stem cavity that houses a linkwork mechanism for engaging and disengaging a piston stop 51 with the piston stop stem collar 46. The piston stop 51 is an inverted U-shaped member which straddles the piston stop stem 45 and which prevents the piston (not shown) within the valve portion 11 from withdrawing the piston stop stem 45 when the piston stop 51 is in the position shown in FIG. 6.

Engaging and disengaging of the piston stop 51 from its position with respect to the piston stop stem 45 is effected with a linkwork including a bell crank or arm 52, with the piston stop 51 hanging from a pin at the remote end of one arm. The arm of the bell crank 52 is adjustable by means of the threaded screw 54 for accurate positioning of the piston stop 51.

The combination of the bell crank 52 and the piston stop 51 is constructed so that gravity urges the piston stop 51 into an engaged position with the piston stop stem 45. When, however, for parts of a valve test procedure when it is desired that the piston within the valve portion 11 be free to withdraw into the portion 11, a fluid operated actuator is provided for activating the bell crank 52. As shown in FIG. 6, the actuator includes a piston cylinder 55, and a piston 56 within the cylinder having a piston rod 58 extending from the piston and into operative engagement with the bell crank 52. Both the piston 56 and the piston rod 58 are provided with o-ring or other fluid seals.

A spring 59 normally urges the piston 56 into engagement with the linkword or bell crank 52 when there is either no pressure, or equal pressure, applied to the cylinder 55 on both sides of the piston 56. In the event, however, that the pressure on the spring side of the cylinder 59 is reduced below that on the piston rod side, the piston 56 is moved away from the bell crank 52, to thereby permit the bell crank 52 to drop the piston stop 51 into an engaged position with the piston stop stem 45.

When there is no pressure on the confining and locating apparatus of FIG. 6, the spring 59 moves the piston 56 toward the valve portion 11, thus moving the bell crank 52 and raising the piston stop 51. When brake pressure is introduced into the housing or cavity, it normally tends to push the piston away from the cavity and lower the piston stop 51 into its engaged position. This however is prevented in normal operation by the introduction of main reservoir pressure air on the spring of the piston 56 within the cylinder 55. As is apparent, the piston 56 has two diameters, the larger diameter being exposed to main reservoir air and the smaller diameter exposed to brake pipe air. When the two pressures are equal, the force on the effectively-larger spring side of the piston 56 causes the piston stop stem to be freed. Should it at any time be desired to engage the piston stop 51, the automatic test sequence program device actuates a solenoid which vents main reservoir pressure from the spring side of the cylinder 55, allowing the brake pipe pressure to move the piston back and engage the piston stop stem.

Observation of the position of the piston stop 51 and of the piston stop stem 45 is provided by a transparent cylinder 60 (FIG. 6) and a viewing port 61 (as shown in FIG. 5). The cylinder 60 is provided with gaskets so that the cylinder is sealed pressure-tight with respect to the cavity when pressure is applied to the nuts 49 or to the pressure plate 41.

AUTOMATIC SYSTEM

Program Control Device

The program device for the system of the invention includes 106 separate channels. The program itself is perforated into a 5 inch paper tape, and the perforations are approximately thirty-thousandths of an inch in diameter. The device reads this program as the tape progresses by means of a vacuum system. The vacuum switches can be individually actuated in accordance with the program. The tape progresses at approximately 50 inches per minute and the tape for an AB service portion takes approximately 4 minutes to complete the test. The tape however, is only 12 feet long, since during part of the test time the machine automatically stops itself and restarts. It is in effect a real time system, where the machine waits for feedback signals to sequence the events. The machine under its own control can stop the progress of the tape. Through combined functions of the various pressure sensing devices the machine can also stop itself while it is waiting for the pressure to rise or drop to a given level. Timing functions of the machine can also be accomplished by timing impulses in the tape itself. Since the rate of progress of the tape is fixed it is possible to precisely control the timing of function simply by the control of the distance between two impulses. A combination of this and a series of timed relay stops provide any desired interval of time.

Adaptations for ABC and ABD Valves

For the ABC valves the only changes which are necessary are to exchange the paper tape program and to make a manual setting of the pressure difference switches. These adjustments are very simple and quick to make since they require only setting two manually adjustable pointers so that the pressure switches will operate at the predetermined and desired pressure differentials. No tools are needed for this adjustment nor does anything have to be opened or dismantled. The adjustment knobs protrude through the faces of these pressure difference switches and as the operator turns the knobs he can see the motion of the guide hands and thus position them properly.

ABD Valves

To set up for ABD valve service portion the round turret head is removed and the rectangular bearing block is substituted on the clamping device. This requires the loosening of one nut on the round turret and the installation of one bolt and nut for the rectangular pressure plate. In addition to this a cut out cock below the program device is set to the ABD position, the appropriate program tape is inserted in the program device, and the pressure difference switches adjusted as indicated on the program.

ABD Valve Emergency Portion

The same test plate is used for ABD emergency portion as for the AB. However because the vent valve opening is offset approximately three-fourths of an inch from the position of the AB vent valve hole it is necessary to insert the offsetting platform in the hollow rod plunger of the test plate.

In automating the AB service portion test, for example, there are two tests, number 9, the piston return spring, and number 4, quick service exhaust test, which are costly to automate. Therefore the sequence of tests is rearranged doing instead of test 1 first, number 9 and then 4 and then 1. This allows the operator to make three manual observations, two for the piston return spring and one for the quick service blow. In effect, in the piston return spring test, the operator observes through the window 61 of the piston stop housing 46 on two occasions when the piston 45 moves. As soon as it moves he activates the go button on the program device and the machine automatically sets its "go—no-go" reading and prints out the results. Test number 4 calls for an observation to be certain that there is a three second blow occuring at the quick service exhaust part of the AB valve. The mechanism for sensing this blow and timing it for three seconds is also expensive to automate, since the blow coming out the exhaust hole is extremely light and since it is difficult to construct a probe or sensing device which could read the blow coming from the rectangular hole in the back cover. One of the reasons for this is the variety of different valve back covers available and the fact that there is no regularity in the casting which would guarantee a good sealing for sensing this pressure blow. By placing these tests at the beginning, the operator makes the three observations within the first fifteen seconds of the test, and then is free for other activities, such as running a second test rack or installing shipping covers etc.

Operating Times Comparisons with Manual Rack, etc.

A fair average time for manual operation of an AB service portion is about 20 minutes. This is the traditional method wherein the operator bolts the service portion to the test plate and performs the entire test manually and makes all observations of flow meters and gauges manually. The test console makes the complete test in approximately 5 minutes. The only manual operations are when the operator installs the portion on the studs of the test plate and places the clamping device into position. He also pushes the restart button three times in the service portion where he makes manual observations. These are finished in about 45 seconds and after that the operator need not be in attendance.

Possibilities of Testing Other Devices

The test console itself is capable of automating the test for any device for which there is a test plate, e.g. any device which is tested on the AB rack or the 4 D rack. Therefore the machine may be programmed for a large number of locomotive and passenger car devices.

Maintenance and Repair

The rack is manufactured largely from standard production line components. The solenoid valves are standard 110 volt solenoids, two way and three way. The relays similarly are low cost, standard two-pole double-throw relays, 24 and 110 volts.

Thus, it is apparent that there has been provided, according to the invention, apparatus which fully satisfies the aims, objects, and advantages set forth earlier. While the sub-components described in detail above are particularly useful with a fully automatic or partly automatic test stand, it is evident, however, that these components may equally find utility with conventional manual air brake test stands.

I claim as my invention:

1. In an apparatus for confining and locating an internal piston of a railway brake control valve during testing wherein said apparatus includes a chamber sealable in pressure tight relation to said valve and having a stop stem-receiving cavity therein, stop stem means threadably connected to said brake piston and extending from said brake control valve into said stop stem-receiving cavity of said chamber and movable piston stop means engageable with said stop stem means to prevent withdrawal of said stop stem from said cavity, the improvement comprising, fluid operated activating means carried by said chamber, linkwork means disposed in said cavity, said linkwork means being connected to said stop means and engageable with said fluid activating means so that the latter selectively activates said stop means through the linkwork means and stop means.

2. Apparatus as claimed in claim 1, wherein said linkwork means comprises a bell crank pivotably mounted in said chamber cavity, said piston stop means being pivotably connected at one end of said crank, the opposite end of said crank engaging said fluid activated means and said crank and piston stop means being positioned by gravity so that said stop means normally engages said stop stem means.

3. Apparatus as claimed in claim 2, wherein said fluid activated means includes a piston cylinder formed in said chamber, a piston in said cylinder having a piston rod extending therefrom to said cavity and engageable with said other end of the bell crank, spring means urging said piston into engagement with said other bell crank end, and conduit means for applying fluid pressure to each side of said piston so that a difference in pressure on the sides of the piston shift the latter for activating and deactivating the linkwork means upon creation of the pressure differential between the fluid pressures applied to each side of the piston.

4. Apparatus as claimed in claim 1, wherein said chamber has a transparent viewing port therein.

* * * * *